(12) United States Patent
Hand et al.

(10) Patent No.: US 10,316,904 B2
(45) Date of Patent: Jun. 11, 2019

US010316904B2

(54) COUPLING ASSEMBLY HAVING AN OVERRUN MODE AND APPENDAGED LOCKING MEMBER FOR USE THEREIN

(71) Applicant: MEANS INDUSTRIES, INC., Saginaw, MI (US)

(72) Inventors: Joshua D. Hand, Midland, MI (US); Terry O. Hendrick, Cass City, MI (US)

(73) Assignee: Means Industries, Inc., Saginaw, MI (US)

( * ) Notice: Subject to any disclaimer, the term of this patent is extended or adjusted under 35 U.S.C. 154(b) by 73 days.

(21) Appl. No.: 15/677,093

(22) Filed: Aug. 15, 2017

(65) Prior Publication Data

US 2018/0087585 A1 Mar. 29, 2018

Related U.S. Application Data

(60) Provisional application No. 62/400,724, filed on Sep. 28, 2016.

(51) Int. Cl.
*F16D 41/12* (2006.01)
*F16D 41/14* (2006.01)

(52) U.S. Cl.
CPC .......... *F16D 41/125* (2013.01); *F16D 41/14* (2013.01)

(58) Field of Classification Search
CPC .............................. F16D 41/125; F16D 41/14
See application file for complete search history.

(56) References Cited

U.S. PATENT DOCUMENTS

| | | | | |
|---|---|---|---|---|
| 4,200,002 | A | 4/1980 | Takahashi | |
| 5,070,978 | A | 12/1991 | Pires | |
| 5,449,057 | A | 9/1995 | Frank | |
| 5,806,643 | A * | 9/1998 | Fitz | F16D 41/125 192/45.1 |
| 5,871,071 | A | 2/1999 | Sink | |
| 5,918,715 | A | 7/1999 | Ruth et al. | |
| 5,927,455 | A | 7/1999 | Baker et al. | |
| 5,954,174 | A | 9/1999 | Costin | |
| 5,964,331 | A | 10/1999 | Reed et al. | |
| 5,979,627 | A | 11/1999 | Ruth et al. | |
| 6,065,576 | A | 5/2000 | Shaw et al. | |
| 6,116,394 | A | 9/2000 | Ruth | |
| 6,125,980 | A | 10/2000 | Ruth et al. | |
| 6,129,190 | A | 10/2000 | Reed et al. | |

(Continued)

*Primary Examiner* — Stacey A Fluhart
(74) *Attorney, Agent, or Firm* — Brooks Kushman P.C.

(57) ABSTRACT

A coupling assembly having an overrun mode and a locking member for use therein are provided. The locking member includes a first member-engaging nose, a second member-engaging tail diametrically opposite the nose and a main body between the nose and the tail. A control element-engaging appendage extends downwardly from a lower face of the main body. A pair of oppositely projecting pivots extend laterally from the tail for enabling pivotal motion of the locking member about a pivot axis which intersects the pivots. A control element engages the appendage to create a moment of the locking member about the pivot axis to urge the locking member from a coupling position towards an uncoupling position. The moment decreases the amount of force needed by the control element to move the locking member out of the coupling position.

21 Claims, 11 Drawing Sheets

(56) References Cited

U.S. PATENT DOCUMENTS

| | | | | |
|---|---|---|---|---|
| 6,186,299 | B1 | 2/2001 | Ruth | |
| 6,193,038 | B1 | 2/2001 | Scott et al. | |
| 6,244,965 | B1 | 6/2001 | Klecker et al. | |
| 6,373,157 | B1 * | 4/2002 | Sekine | F16D 41/125 192/46 |
| 6,386,349 | B1 | 5/2002 | Welch | |
| 6,481,551 | B1 | 11/2002 | Ruth | |
| 6,505,721 | B1 | 1/2003 | Welch | |
| 6,571,926 | B2 | 6/2003 | Pawley | |
| 6,854,577 | B2 | 2/2005 | Ruth | |
| 7,100,756 | B2 | 9/2006 | Kimes et al. | |
| 7,223,198 | B2 | 5/2007 | Kimes et al. | |
| 7,258,214 | B2 | 8/2007 | Pawley et al. | |
| 7,275,628 | B2 | 10/2007 | Pawley et al. | |
| 7,344,010 | B2 | 3/2008 | Fetting, Jr. et al. | |
| 7,383,930 | B2 | 6/2008 | Kimes et al. | |
| 7,448,481 | B2 | 11/2008 | Kimes et al. | |
| 7,450,548 | B2 | 11/2008 | Haustein et al. | |
| 7,451,862 | B2 | 11/2008 | Kimes et al. | |
| 7,455,156 | B2 | 11/2008 | Kimes et al. | |
| 7,455,157 | B2 | 11/2008 | Kimes et al. | |
| 7,484,605 | B2 | 2/2009 | Pawley et al. | |
| 7,614,486 | B2 | 11/2009 | Bird et al. | |
| 7,661,518 | B2 | 2/2010 | Kimes | |
| 7,743,678 | B2 | 6/2010 | Wittkopp et al. | |
| 7,942,781 | B2 | 5/2011 | Kimes | |
| 7,980,372 | B2 | 7/2011 | Wiesneth et al. | |
| 7,992,695 | B2 | 8/2011 | Wittkopp et al. | |
| 8,042,669 | B2 | 10/2011 | Samie et al. | |
| 8,042,670 | B2 | 10/2011 | Bartos et al. | |
| 8,051,959 | B2 | 11/2011 | Eisengruber | |
| 8,056,690 | B2 | 11/2011 | Samie et al. | |
| 8,079,453 | B2 | 12/2011 | Kimes | |
| 8,083,042 | B2 | 12/2011 | Samie et al. | |
| 8,091,696 | B2 | 1/2012 | Wittkopp et al. | |
| 8,491,439 | B2 | 7/2013 | Kimes | |
| 8,646,587 | B2 | 2/2014 | Kimes | |
| 8,720,659 | B2 | 5/2014 | Pawley | |
| 8,844,693 | B2 | 9/2014 | Pawley | |
| 8,881,516 | B2 | 11/2014 | Bird et al. | |
| 8,986,157 | B2 | 3/2015 | Kimes | |
| 9,121,454 | B2 | 9/2015 | Pawley | |
| 9,186,977 | B2 | 11/2015 | Kimes | |
| 9,188,170 | B2 | 11/2015 | Prout et al. | |
| 9,188,172 | B2 | 11/2015 | Fetting et al. | |
| 9,188,174 | B2 | 11/2015 | Beiser et al. | |
| 2008/0110715 | A1 | 5/2008 | Pawley | |
| 2008/0169165 | A1 | 7/2008 | Samie et al. | |
| 2009/0159391 | A1 | 6/2009 | Eisengruber | |
| 2010/0288592 | A1 | 11/2010 | Papania et al. | |
| 2011/0183806 | A1 | 7/2011 | Wittkopp et al. | |
| 2011/0214962 | A1 | 9/2011 | Shaw et al. | |
| 2011/0269587 | A1 | 11/2011 | Papania | |
| 2011/0297500 | A1 | 12/2011 | Shaw et al. | |
| 2014/0116832 | A1 | 5/2014 | Beiser et al. | |
| 2014/0190785 | A1 | 7/2014 | Fetting et al. | |
| 2016/0160942 | A1 | 6/2016 | Shioiri et al. | |
| 2016/0230819 | A1 | 8/2016 | Shioiri et al. | |
| 2017/0219026 | A1 * | 8/2017 | Kurosaki | F16D 41/125 |
| 2018/0259012 | A1 * | 9/2018 | Shibata | F16D 23/14 |
| 2018/0266503 | A1 * | 9/2018 | Shioiri | F16D 41/14 |

* cited by examiner

COUPLING ASSEMBLY HAVING AN OVERRUN MODE AND APPENDAGED LOCKING MEMBER FOR USE THEREIN

CROSS-REFERENCE TO RELATED APPLICATIONS

This application claims the benefit of U.S. provisional application Ser. No. 62/400,724 filed Sep. 28, 2016, the disclosure of which is hereby incorporated in its entirety by reference herein.

TECHNICAL FIELD

This invention relates in general to the field of coupling assemblies having an overrun mode and locking members such as struts for use therein.

Overview

As described in U.S. Pat. No. 8,844,693 (i.e., see, FIG. 6 herein which corresponds to FIG. 3 of the patent), overrunning coupling assemblies may be used for transferring torque from a driving member to a driven member in a variety of structural environments. This permits the transfer of torque from a driving member to a driven member while permitting freewheeling motion of the driving member relative to the driven member when torque is interrupted. Such couplings often comprise an outer race concentrically disposed with respect to an inner race, the outer race having cammed surfaces that define a pocket in which coupling rollers are assembled.

The driving member is connected to one race, and the driven member is connected to the other race. During torque transfer from the driving member to the driven member, the rollers become locked with a camming action against the cam surfaces, thereby establishing a positive driving connection between the driving member and the driven member. When the torque is interrupted, the driven member may freewheel relative to the driving member as the rollers become unlocked from their respective cam surfaces.

Another common overrunning coupling includes overrunning coupling sprags disposed between the inner cylindrical surface of an outer race and the outer cylindrical surface of an inner race so that the sprags lock the races together as torque is delivered to the driven member. The sprags become unlocked with respect to the inner and outer race surfaces when torque transfer is interrupted.

A pocket plate may be provided with angularly disposed recesses or pockets about the axis of a one-way clutch. The pockets are formed in the planar surface of the pocket plate. Each pocket receives a torque transmitting strut, one end or tail of which engages an anchor point in a pocket of the pocket plate. An opposite edge of the strut, which may hereafter be referred to as an active edge or nose, is movable from a position within the pocket to a position in which the active edge extends outwardly from the planar surface of the pocket plate. The struts may be biased away from the pocket plate by individual springs.

A notch plate may be formed with a plurality of recesses or notches located approximately on the radius of the pockets of the pocket plate. The notches are formed in the planar surface of the notch plate.

Another example of an overrunning planar clutch is disclosed in U.S. Pat. No. 5,597,057.

Other U.S. patents related to the present invention include: U.S. Pat. Nos. 5,070,978; 5,449,057; 5,806,643; 5,871,071; 5,918,715; 5,964,331; 5,927,455; 5,979,627; 6,065,576; 6,116,394; 6,125,980; 6,129,190; 6,186,299; 6,193,038; 6,244,965; 6,386,349; 6,481,551; 6,505,721; 6,571,926; 6,854,577; 7,258,214; 7,275,628; 7,344,010; and 7,484,605.

As disclosed in FIG. 1, (i.e. FIG. 10 of U.S. Pat. No. 6,186,299), a strut pocket is sufficiently enlarged in a direction forward of the front edge of the strut to allow sliding movement of the strut from the position shown in phantom to the overrun position shown in solid lines wherein the forward corner of the strut engages the outer circumferential rail of the notch plate during overrunning to prevent the struts from slapping against the notch recesses during overrunning. Each strut pocket provides sufficient clearance forward of the respective opposite edge of the strut to allow forward sliding movement of the respective strut during overrunning to cause the engagement of the respective spring and strut to occur nearer the ear axis, thereby reducing the length of a moment arm about which the spring acts upon the strut.

Yet still other related U.S. patents include: U.S. Pat. Nos. 4,200,002; 5,954,174; and 7,025,188.

More recent related patent documents include U.S. Pat. Nos. 7,100,756; 7,223,198; 7,383,930; 7,448,481; 7,451,862; 7,455,156; 7,455,157; 7,450,548; 7,614,486; 7,661,518; 7,743,678; 7,942,781; 7,980,372; 7,992,695; 8,042,669; 8,042,670; 8,051,959; 8,056,690; 8,079,453; 8,083,042; 8,091,696; 8,491,439; 8,646,587; 8,720,659; 8,844,693; 8,881,516; 8,986,157; 9,121,454; 9,186,977; 9,188,170; 9,188,172; and 9,188,174. Also included are published U.S. patent applications Nos. 2008/0110715; 2011/0269587; 2011/0183806; 2011/0214962; 2011/0297500; 2008/0169165; 2009/0159391; 2010/0288592; 2014/0116832; 2014/0190785; and 2016/0230819.

As disclosed in FIGS. 2 and 3 (i.e. FIGS. 8 and 10 of U.S. Pat. No. 9,121,454), a locking member for controllably transmitting torque between first and second coupling members of a coupling assembly is shown. The locking member includes projecting inner and outer pivots which extend laterally from a main body portion for enabling pivotal motion of the locking member about a pivot axis which intersects the pivots. The pivots are sized, shaped and located with respect to the main body portion to allow frictional engagement of an end surface of the outer pivot with an outer wall of a pocket to occur near the pivot axis during rotation of the first coupling member and the locking member above a predetermined RPM thereby reducing overall moment on the locking member about the pivot axis that has to be overcome to move the locking member between the engaged and disengaged positions.

FIGS. 4, 5*a* and 5*b* (i.e. FIGS. 4*a* and 2, respectively, of U.S. 2016/0160942) discloses a selectable one-way clutch (i.e. SOWC) configured to prevent an unintentional engagement. A pawl comprises a strut that is pushed up toward a notch through an aperture of a selector plate, a stopper plate protruding laterally from a rear end side of the strut, and a first inclined face formed on the stopper plate to incline downwardly from the rear end side toward the leading end side of the strut. A side plate is formed along each long side of the aperture to protrude toward the pocket plate, and the second inclined face is formed on the side plate to be brought into contact to the first inclined face.

Metal injection molding (MIM) is a metalworking process where finely-powdered metal is mixed with a measured amount of binder material to comprise a "feedstock" capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling", "clutch" and "brake" may be used interchangeably.

A "moment of force" (often just moment) is the tendency of a force to twist or rotate an object. A moment is valued mathematically as the product of the force and a moment arm. The moment arm is the perpendicular distance from the point or axis of rotation to the line of action of the force. The moment may be thought of as a measure of the tendency of the force to cause rotation about an imaginary axis through a point.

In other words, a "moment of force" is the turning effect of a force about a given point or axis measured by the product of the force and the perpendicular distance of the point from the line of action of the force. Generally, clockwise moments are called "positive" and counterclockwise moments are called "negative" moments. If an object is balanced then the sum of the clockwise moments about a pivot is equal to the sum of the counterclockwise moments about the same pivot or axis.

SUMMARY OF EXAMPLE EMBODIMENTS

An object of at least one embodiment of the present invention is to provide a coupling assembly having an overrun mode and an appendaged locking member for use in the assembly wherein a higher torque-locked assembly can be disengaged with lower force.

In carrying out the above object and other objects of at least one embodiment of the present invention, a coupling assembly having an overrun mode is provided. The assembly includes first and second members including first and second coupling faces, respectively, in close-spaced opposition with one another. At least one of the members is mounted for rotation about an axis. A locking member is disposed between the coupling faces of the first and second members. The locking member is movable between coupling and uncoupling positions. A control element is mounted for controlled movement between the coupling faces and is operable to control position of the locking member. The locking member includes a first member-engaging nose, a second member-engaging tail diametrically opposite the nose and a main body between the nose and the tail. The main body has upper and lower faces. The locking member further includes a control element-engaging appendage which extends downwardly from the lower face and a pair of oppositely projecting pivots which extend laterally from the tail for enabling pivotal motion of the locking member about a pivot axis which intersects the pivots. The control element engages the appendage to create a moment of the locking member about the pivot axis to urge the locking member from the coupling position towards the uncoupling position. The coupling position is characterized by abutting engagement of the nose with the first member to allow one-way torque transfer to occur between the first and second members. The uncoupling position is characterized by non-abutting engagement of the nose with the first member. The moment decreases the amount of force needed by the control element to move the locking member out of the coupling position.

The control element may have at least one opening which extends completely therethrough to allow the locking member to extend therethrough to the coupling position in a control position of the control element.

The appendage may include a pair of oppositely projecting ears which extend laterally.

One of the first and second members may be a notch plate and the other of the first and second members may be a pocket plate.

The assembly may be a controllable or selectable one-way clutch assembly.

The appendage may be centrally located between side faces of the main body and may have a face which inclines downwardly away from the tail.

The control element may be a control or selector plate rotatable about the axis.

The assembly may further include a biasing member carried by the second member to urge the locking member toward the coupling position.

The appendage may include oppositely projecting ramp portions which extend laterally. Each of the ramp portions may have a face which inclines upwardly toward the tail.

The control element may be either non-planar or planar.

Further in carrying out the above object and other objects of at least one embodiment of the present invention, a locking member for a coupling assembly including first and second coupling members and a control element is provided. The locking member includes a first member-engaging nose, a second member-engaging tail diametrically opposite the nose and a main body between the nose and the tail. The main body has upper and lower faces. The locking member also includes a control element-engaging appendage which extends downwardly from the lower face and a pair of oppositely projecting pivots which extend laterally from the tail for enabling pivotal motion of the locking member about a pivot axis which intersects the pivots. The control element engages the appendage to create a moment of the locking member about the pivot axis to urge the locking member from a coupling position towards an uncoupling position. The coupling position is characterized by abutting engagement of the nose with the first coupling member to allow one-way torque transfer to occur between the coupling members. The uncoupling position is characterized by non-abutting engagement of the nose with the first coupling member. The moment decreases the amount of force needed by the control element to move the locking member out of the coupling position.

The locking member may be a strut.

An end of the tail may be canted.

The strut may be a ratchet strut.

The appendage may include a pair of oppositely projecting ears which extend laterally.

The appendage may be centrally located between side faces of the main body and may have a face which inclines downwardly away from the tail.

The appendage may include oppositely projecting ramp portions which extend laterally. Each of the ramp portions may have a face which inclines upwardly toward the tail.

The locking member may be an injection molded locking member such as a metal injection molded locking member.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
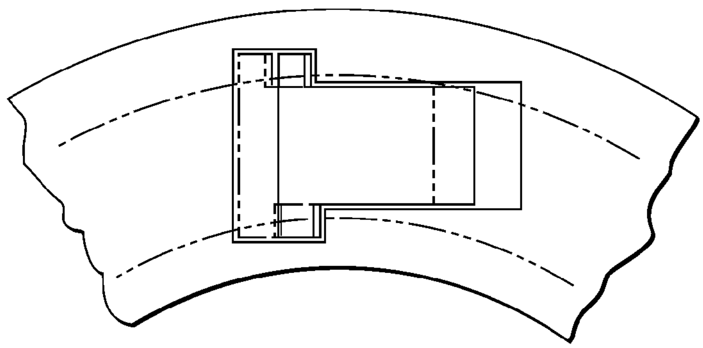
FIG. 1 is a top plan view, partially broken away, of a prior art pocket plate and a strut slidable within a pocket of the plate.
Figure 2:
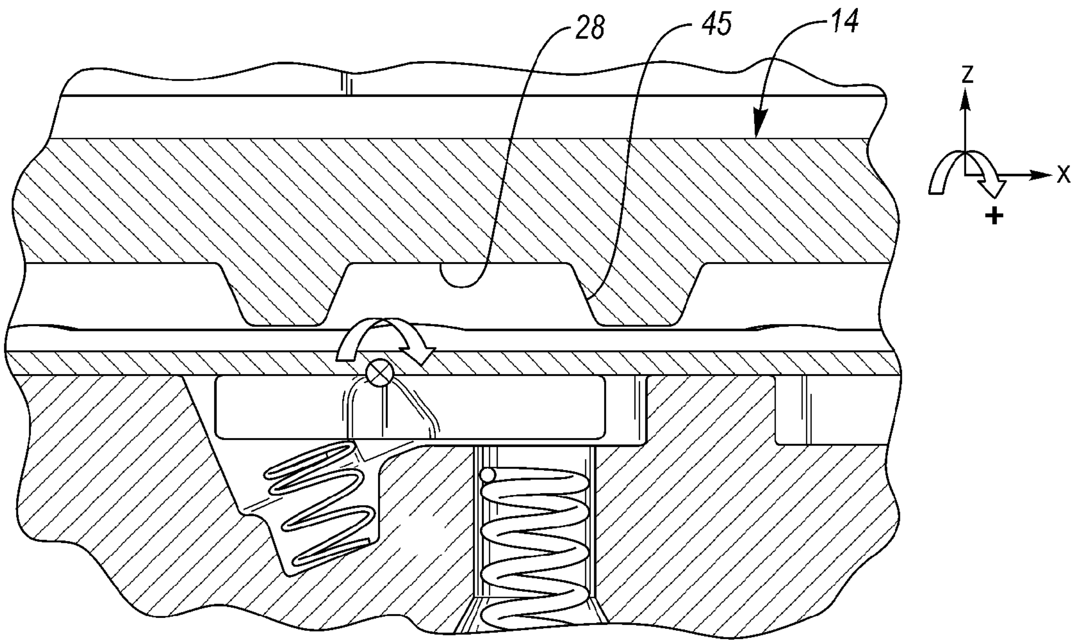
FIG. 2 is a side view, partially broken away and in cross section, of a prior art coupling assembly with a locking member or strut shown in its uncoupling position.
Figure 3:
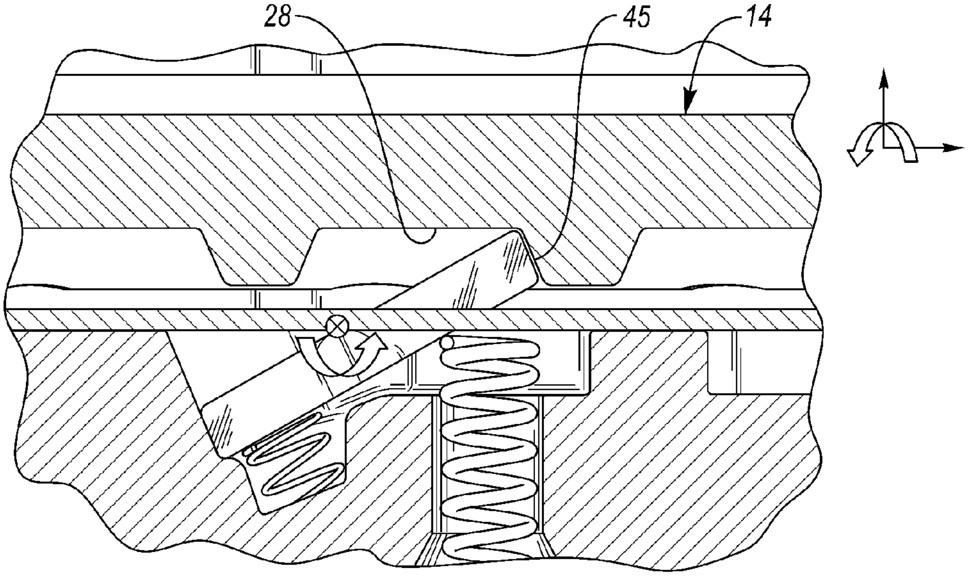
FIG. 3 is a view similar to the view of FIG. 2, with the strut in its locking position.
Figure 4:
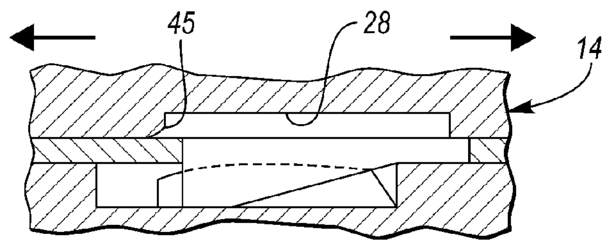
FIG. 4 is a side view, partially broken away and in cross section, of a prior art coupling assembly with its strut in its uncoupling position.
Figure 5A:
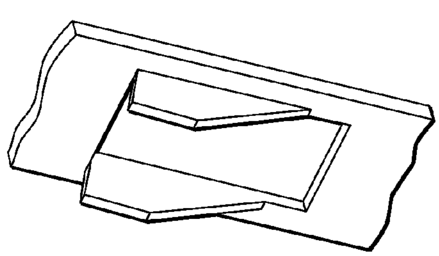
FIG. 5A is a bottom perspective view, partially broken away, of a selector plate of the assembly of FIG. 4.
Figure 5B:
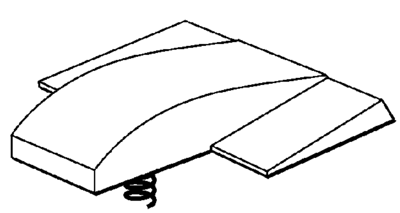
FIG. 5B is a top perspective view of the strut of the assembly of FIG. 4.
Figure 6:
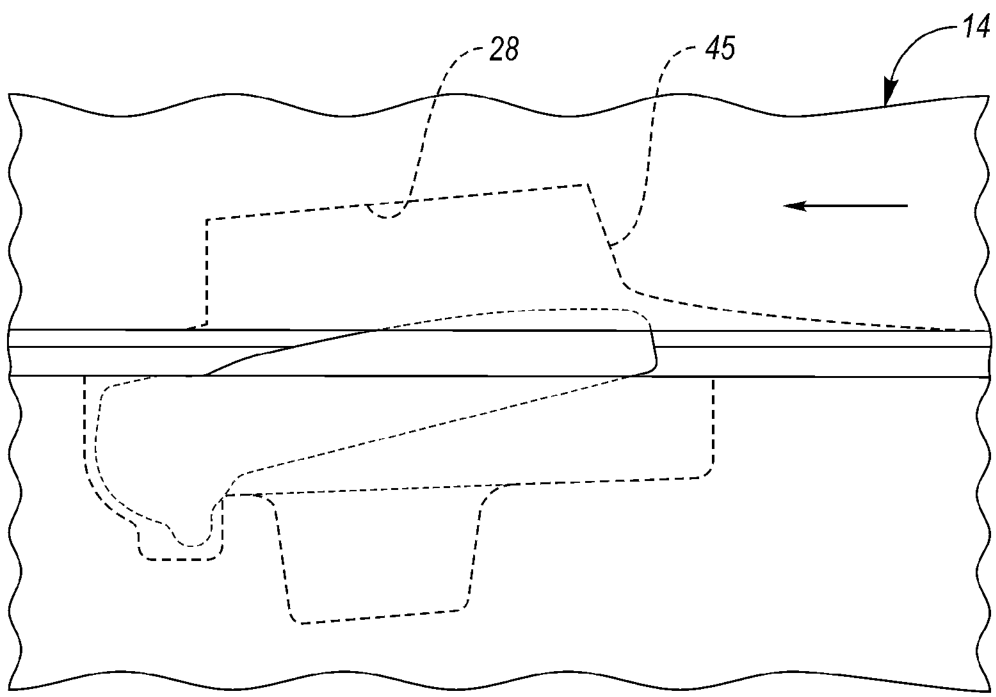
FIG. 6 is a side view, partially broken away, of a prior art coupling assembly with a locking member of the assembly extending between driving and driven numbers of the assembly.
Figure 7A:
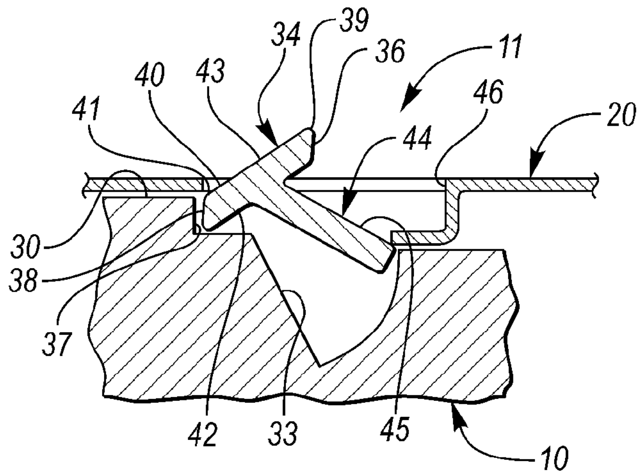
FIG. 7A is a side view, partially broken away and in cross section, of a coupling assembly (without its notch plate) with a locking member constructed in accordance with at least one embodiment of the present invention extending through an apertured control element.
Figure 7B:
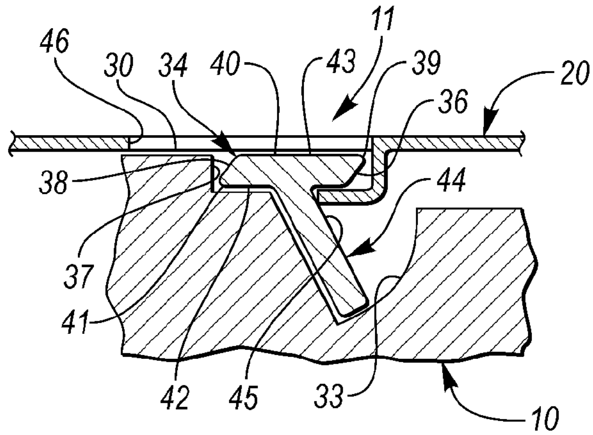
FIG. 7B is a view similar to the view of FIG. 7A, but showing the locking member in is uncoupling position, having been rotated by the control element.
Figure 7C:
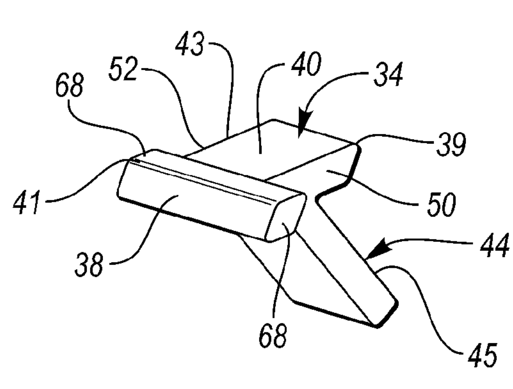
FIG. 7C is a top perspective view of the locking member of FIGS. 7A and 7B.

FIGS. 7A, 7B and 7C show a pocket member or plate, generally indicated at 10, of a planar or overrunning coupling or clutch assembly, and constructed in accordance with at least one embodiment of the present invention. A coupling or notch plate of the assembly is typically nested within the pocket plate 10 and, while not shown in drawing FIGS. 7A-10F, is generally of the type illustrated in FIGS. 2, 3, 4 and 6 at reference numeral 14. The notch plate 14 may be connected to a part (not shown) via internal splines formed on the notch plate 14, which engage splines on the part. The pocket plate 10 may be typically provided with external splines.

An actuator (not shown) may be drivably connected to an apertured slide or control element or plate, generally indicated at 20, thereby causing the control plate 20 to be adjusted angularly with respect to a central axis about which at least one of the plates 14 and 10 is rotatable. The control plate 20 is disposed between the plates 10 and 14 for limited angular rotation relative to the plates 10 and 14, as generally illustrated in U.S. Pat. No. 7,344,010.

The control element or plate 20 is typically not a full circular part thereby requiring less material to manufacture the part. Hence, the parts 10, 14 and 20 can be nested closer together during a stamping assembly operation. Also, because the control plate 20 is not fully circular, it is easier to install into the clutch assembly.

The plate 14 can free-wheel in one angular direction about the central axis relative to the plate 10. The one-directional, free-wheeling motion is achieved in an operating mode when the actuator adjusts the angular position of the control plate 20 relative to the pocket plate 10 (such as via a fork) about the central axis to a forward position which is obtained by moving the control plate 20 angularly a few degrees (such as 10°) from its reverse position.

The notch plate 14 typically has an inside or reference surface or coupling face with one or more notches formed therein and separated by common walls. The notch plate 14 may be adapted to be received in the pocket plate 10 as previously mentioned.

The pocket plate 10 has an inside surface 30 with forward recesses (not shown) and reverse pockets or recesses 33 formed in corresponding pawl-holding portions of the plate 10. Located intermediate the inside surfaces of the plate 14 and the plate 10, respectively, is the control plate 20.

In one embodiment, there may be nineteen struts or pawls received and retained in the nineteen recesses (twelve forward recesses and seven reverse recesses 33) in the pocket plate 10. Twelve of the pawls are "eared" forward pawls (not shown) for transferring torque in a forward direction about the central axis and seven of the pawls are "eared" reverse pawls, generally indicated 34, clustered or grouped closely together in a curved row or line for preventing rotation between the members 10 and 14 in the "reverse" direction about the central axis. Each of the "eared" forward struts or pawls include a planar substantially rectangular portion and a pair of ears, as generally shown in U.S. Pat. No. 6,065,576.

Referring to FIGS. 7A, 7B and 7C, each of the reverse pawls or struts 34 includes a first end surface or face 36 at a nose end 39 of the strut 34. The strut 34 further includes a second end surface or face 38 at a tail end 41 of the strut 34 diametrically opposite the first end surface 36. The tail end 41 engages a shoulder 37 in the plate 10. The strut 34 further includes upper and lower faces 40 and 42, respectively, of a main body portion 43 of the strut 34

The strut 34 also includes a control element-engaging appendage, generally indicated at 44, which extends downwardly from the lower face 42 of the main body 43 towards the nose 39 and away from the tail 41. The control element 20 exerts a force on the appendage 44 when the control element 20 is rotated and the strut 34 extends through an aperture 46 in the plate 20 to create a moment of the locking member 34 about a pivot axis which intersects pivots 68 of the locking member or strut 34. This movement urges the locking member or strut 34 towards an uncoupling position (i.e. FIG. 7B) characterized by non-abutting engagement of the nose 39 with the first member of plate 14 upon rotation (i.e. in a first direction) of the plate 14 relative to the plate 10 to prevent abutting engagement of the strut 34 with a shoulder 45 (FIGS. 2, 3, 4 and 6) of the plate 14 in the overrun mode.

A second embodiment of the invention is shown in drawing FIGS. 8A-8H. The third embodiment of the invention is shown in drawing FIGS. 9A-9H. The fourth embodiment of the invention is shown in drawing FIGS. 10A-10F. The reference numbers for each of the embodiments are the same except in the second, third and fourth embodiments a single, double or triple prime designation, respectively, are provided to indicate parts or portions which are the same or similar in either structure or function as in the first embodiment of FIGS. 7A-7C.

For example, in the first and second embodiments of FIGS. 7A-8H, the appendage 44 or 44' is centrally located between side faces 50 and 52, or 50' and 52' of the main body 43 or 43' and has a control element-engaging face 45 or 45' which inclines downwardly away from the tail 41 or 41', respectively.

In the third embodiment of FIGS. 9A-9H, the appendage 44" includes oppositely projecting ramp portions 48" which extend laterally. Each of the ramp portions 48" has a control element engaging face 49" which inclines upwardly toward the tail 41".

In the fourth embodiment of FIGS. 10A-10F, the appendage 44''' includes a pair of oppositely projecting ears 48''' which extend laterally and have control element-engaging faces 49''' on their opposite sides.

The third and fourth embodiments allow either forward or reverse selector plate motion to disengage their respective struts 34" and 34', respectively, from their coupling positions.

Figure 8A:
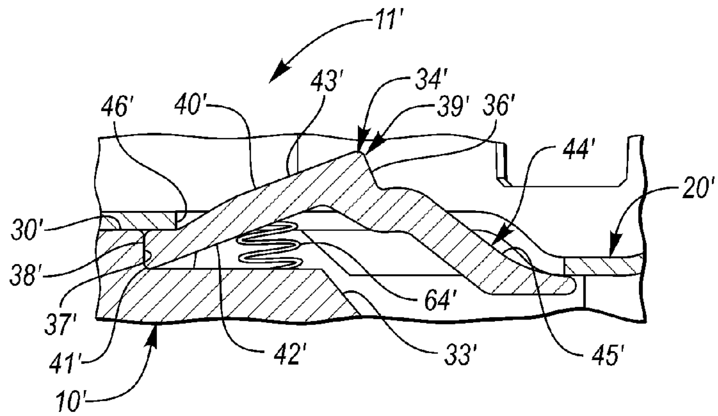
FIG. 8A is a side view, partially broken away and in cross section, of a second embodiment of the coupling assembly (without its notch plate) with its biased locking member extending through its apertured control element.
Figure 8B:
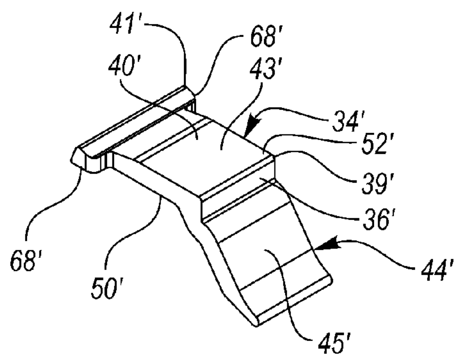
FIG. 8B is a top perspective view of the locking member of FIG. 8A.
Figure 8C:
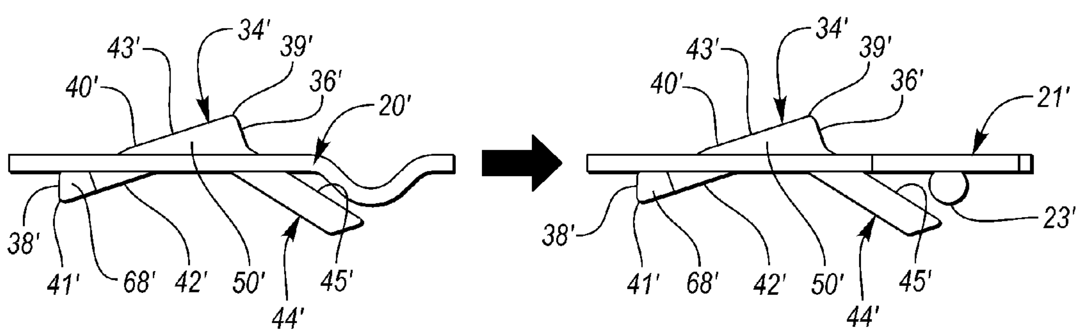
FIG. 8C is a side view, partially broken away, of two alternative embodiments of the control element of FIG. 8A.
Figure 8D:
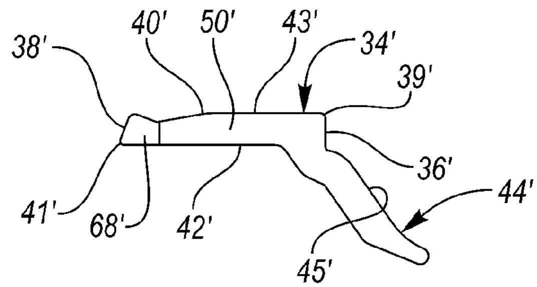
FIG. 8D is a side elevational view of the locking member of FIGS. 8A-8C.
Figure 8E:
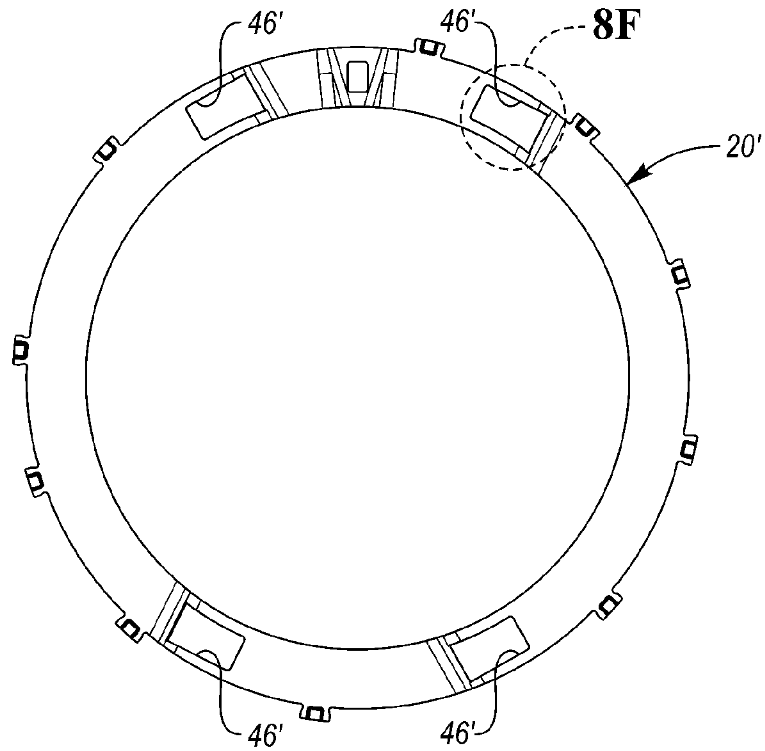
FIG. 8E is a top plan view of the control element of FIG. 8A.
Figure 8F:
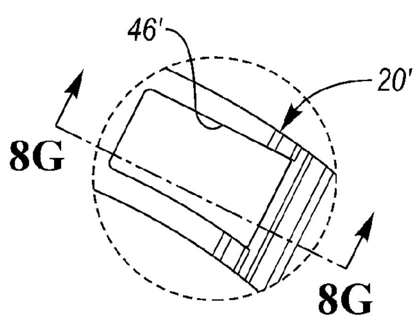
FIG. 8F is an enlarged view contained within the dashed circle of FIG. 8E and illustrating an aperture of the control element.
Figure 8G:
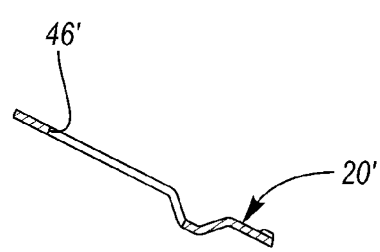
FIG. 8G is a view, partially broken away and in cross section, of the control element taken along lines 8G-8G of FIG. 8F.
Figure 8H:
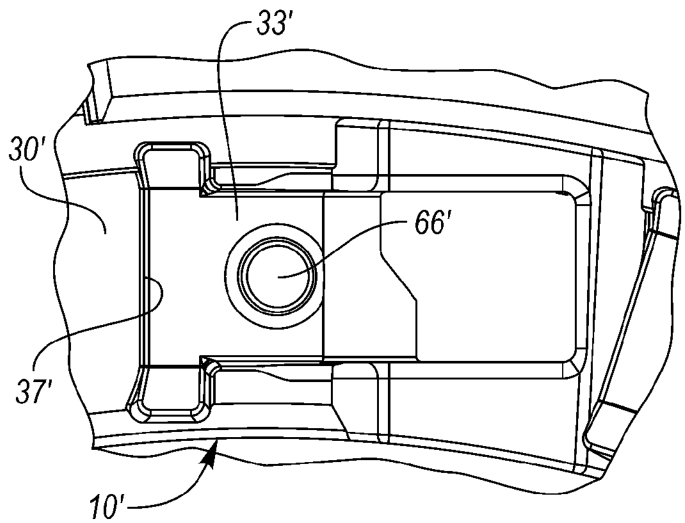
FIG. 8H is a top plan view, partially broken away, of a portion of the pocket plate of FIG. 8A.
Figure 9A:
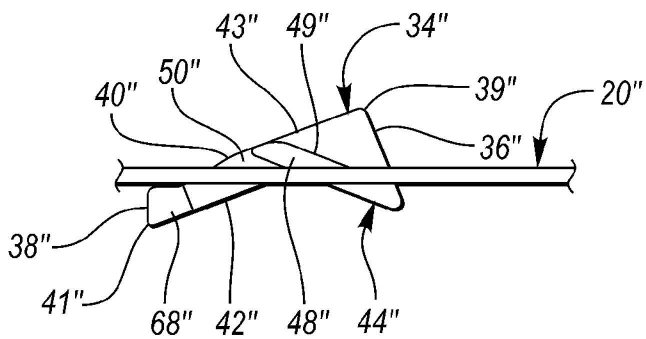
FIG. 9A is a side view, partially broken away, of a third embodiment of a locking member and a control element.
Figure 9B:
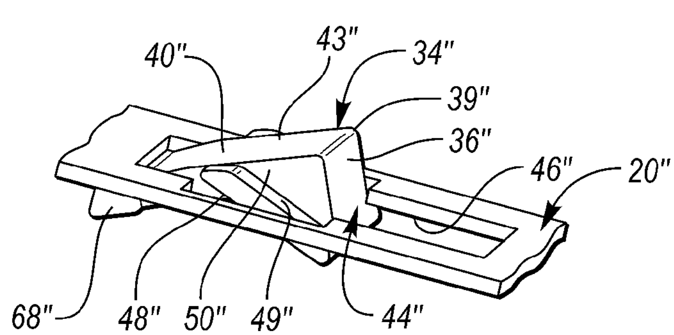
FIG. 9B is a top perspective view, partially broken away, of the locking member and control element of FIG. 9A.
Figure 9C:
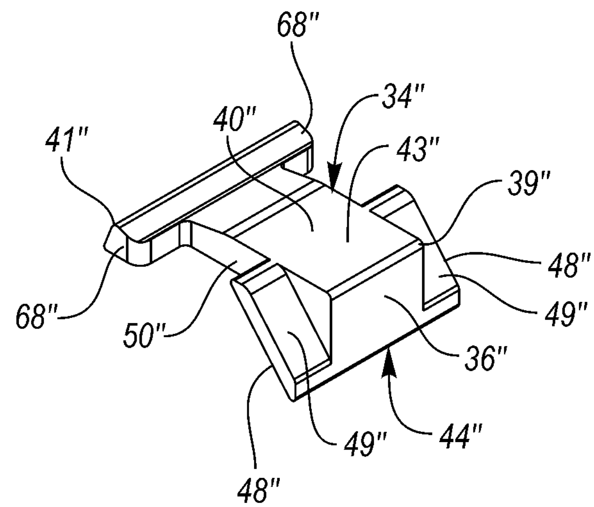
FIG. 9C is a top perspective view of the locking member of FIGS. 9A and 9B.
Figure 9D:
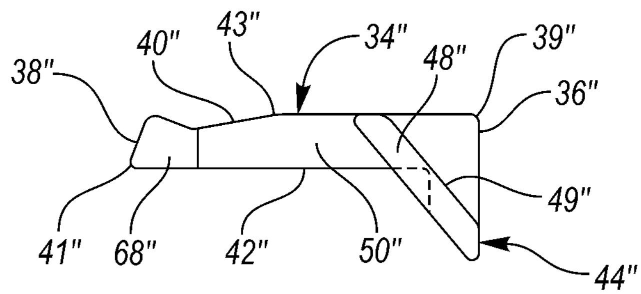
FIG. 9D is a side elevational view of the locking member of FIGS. 9A-9C.
Figure 9E:
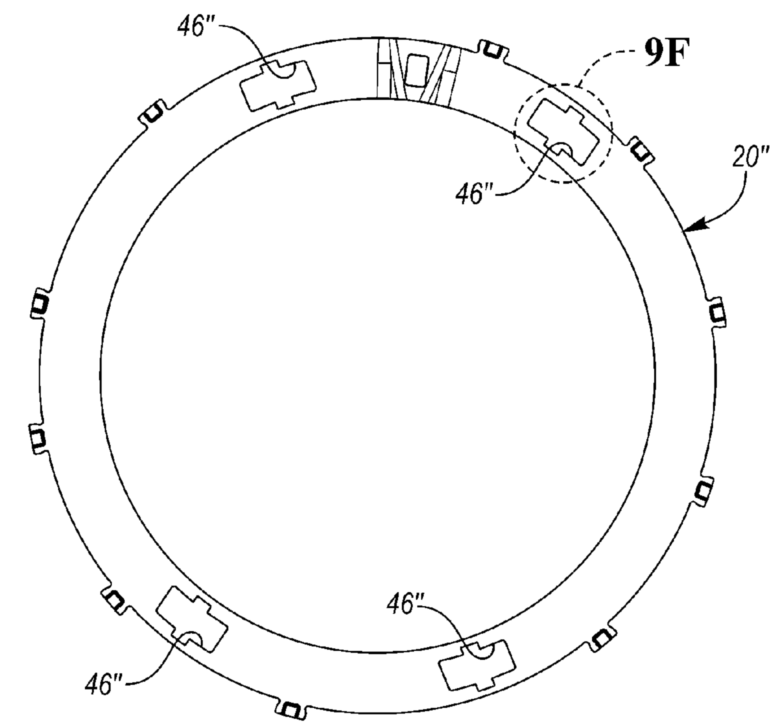
FIG. 9E is a top plan view of the control element of FIGS. 9A and 9B.
Figure 9F:
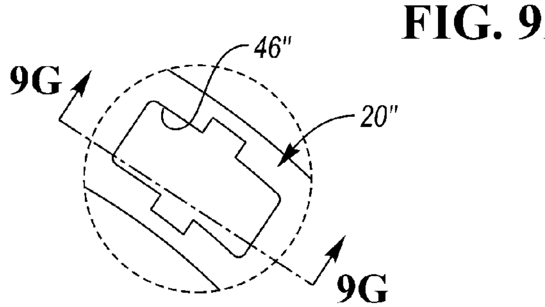
FIG. 9F is an enlarged view of an aperture contained within the dotted circle of FIG. 9E.
Figure 9G:
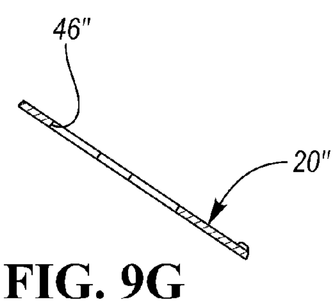
FIG. 9G is a view, partially broken away and in cross section, of the control element taken along lines 9G-9G in FIG. 9F.
Figure 9H:
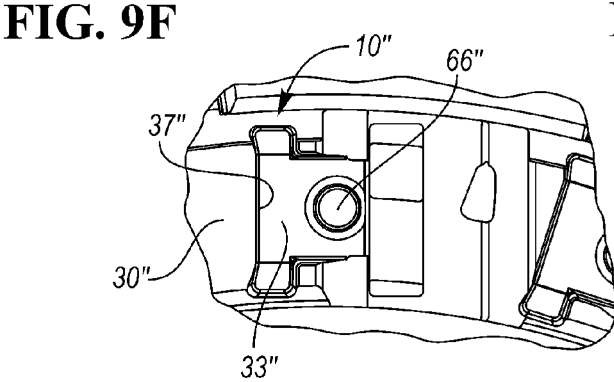
FIG. 9H is a top plan view, partially broken away, of a pocket plate for use with the control element and locking member of FIGS. 9A-9G.
Figure 10A:
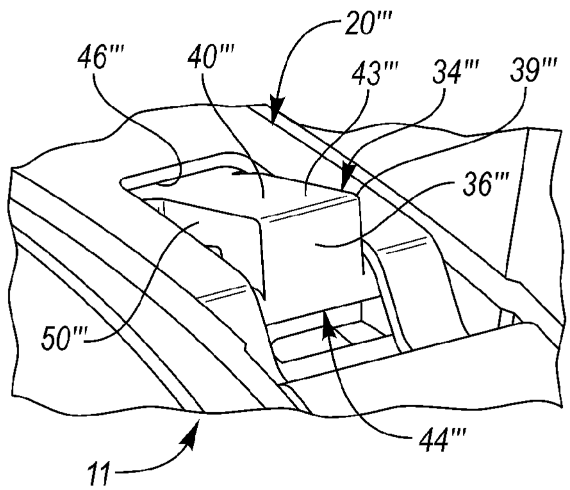
FIG. 10A is a top perspective view, partially broken away, of a further embodiment of a coupling assembly (without its notch plate) with its locking member in its coupling position.
Figure 10B:
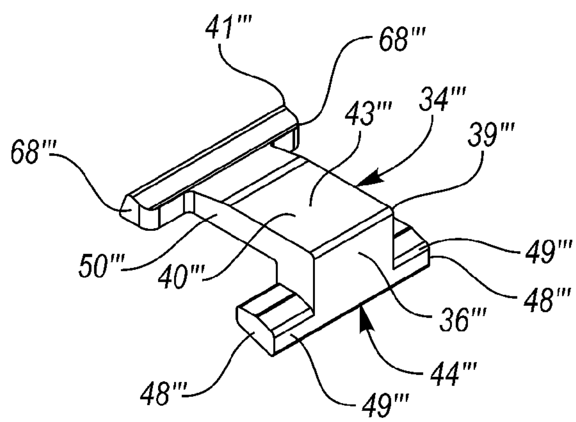
FIG. 10B is a top perspective view of the locking member of FIG. 10A.
Figure 10C:
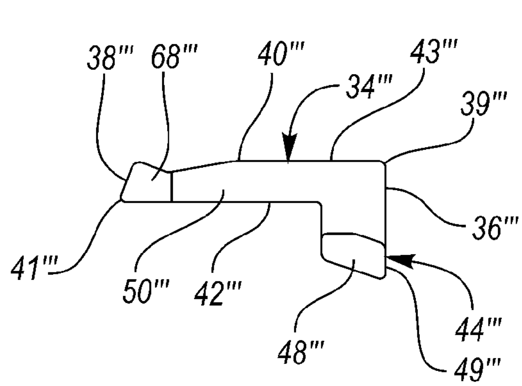
FIG. 10C is a side elevational view of the locking member of FIGS. 10A and 10B.
Figure 10D:
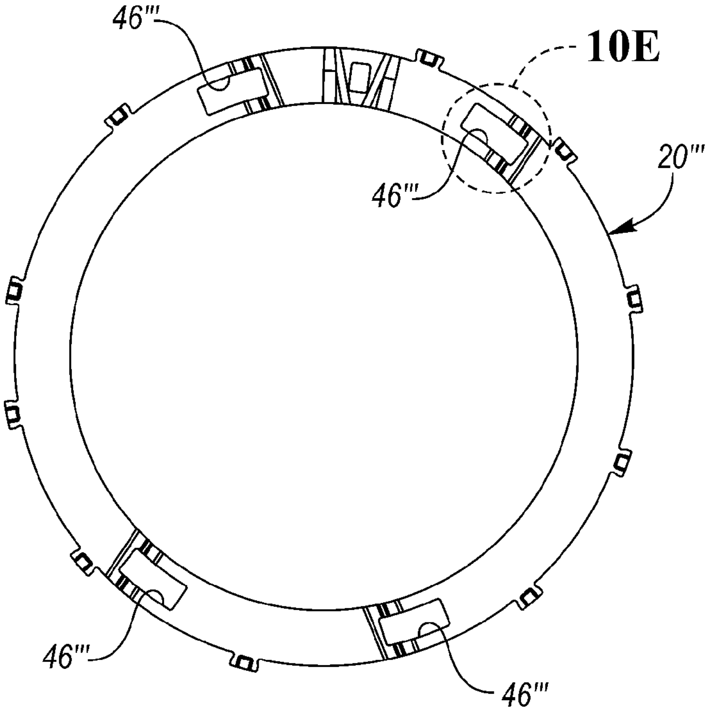
FIG. 10D is a top plan view of an apertured control element used in the coupling assembly of FIG. 10A.
Figure 10E:
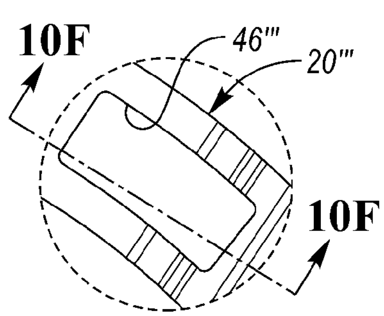
FIG. 10E is an enlarged view of a portion of the control element appearing within the dotted circle 10E in FIG. 10D.
Figure 10F:
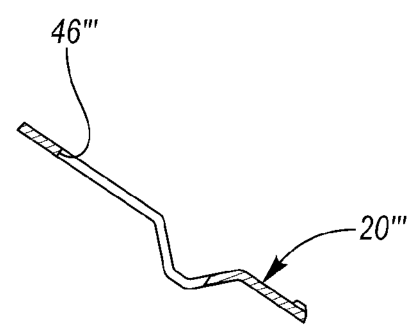
FIG. 10F is a view, partially broken away and in cross section, of the control element taken along lines 10F-10F in FIG. 10E.

In the embodiment of FIG. 8C, the left-hand side of the Figure shows a bent or non-planar control element 20' and the right-hand side of the Figure shows an alternative planar control element 21' having a support rod 23' welded to the lower surface of the element 21' so the element 21' need not be bent or shaped like the element 20'.

When the control plate 20 (or 20', or 20" or 20''') is situated in its "forward" position it covers the "reverse" set of clustered pawls or struts 34 (or 34' or 34" or 34'''). When the control plate 20 is situated in the "reverse" position it does not cover the "reverse" set of clustered struts 34. When uncovered, the "reverse" struts 34 are allowed to ratchet. The reverse struts 34 (34' or 34" or 34''') prevent rotation between the pocket plate 10 (or 10' or 10") and notch plate 14 in the "reverse" direction. (A pocket plate is not shown for the fourth embodiment but is substantially similar to the pocket plates of the other drawing figures.)

In the example described above, the control plate 20 (or 20', or 20" or 20''') is preferably provided with seven clustered or grouped apertures 46 (or 46', or 46" or 46'''). These are spaced and arranged angularly about the central axis of assembly rotation. When the control plate 20 (or 20', or 20" or 20''') is appropriately positioned in a "reverse" position, one aperture 46 (or 46', or 46" or 46''') will be disposed directly over each recess 33 (or 33' or 33").

The apertures 46 (or 46', or 46" or 46''') and the notches 28 are sized so that portions of the reverse pawls 34 (or 34', or 34" or 34''') can enter the notches 28 of pawl-receiving portions of the notch plate 14 and engage shoulders 45 of the notches 28 to establish a locking action between the reverse pawls 34 (or 34', or 34" or 34''') and the plate 14 that will prevent rotation between the plate 14 and the plate 10 (or 10' or 10").

When control plate 20 (or 20', or 20" or 20''') is rotated to a different (i.e. forward) angular position from the reverse position, a portion of the control plate 20 (or 20', or 20" or 20'") about its aperture 46 engages a face or surface of the appendage 44 (or 44', or 44" or 44'") of the pawls to cause the reverse pawls 34 (or 34', or 34" or 34'") to rotate downwardly about a pivot axis of their pivots 68 into their recesses 33 (or 33', or 33" or 33'") and will be at least partially covered by the control plate 20 (or 20', or 20" or 20'") and prevented from moving pivotally upward at an engagement point. When the control plate 20 (or 20', or 20" or 20'") is thus positioned, the plate 14 can free-wheel about the central axis with respect to the plate 10 (or 10', or 10").

The "eared" forward pawls are typically not covered by the control plate 20 (or 20', or 20" or 20'") but only by the notch plate 14. The forward pawls typically may rotate outwardly while being partially held by the notch plate 14.

The reverse pawls or struts 34 (or 34', or 34" or 34'") each have the pair of oppositely projecting pivots 68 (or 68', or 68" or 68'") which extend laterally from their tails 41 (or 41', or 41" or 41'") and define the pivot axis of the struts 34.

Although any suitable strut spring can be used with each embodiment of the invention, a coil spring 64' (FIG. 8A) is typically located under each of the forward pawls and the reverse pawls 34 (or 34', or 34" or 34'") within recesses 66' (FIG. 8H) or 66" (FIG. 9H) formed in the recesses 33' or 33", respectively.

When the notch plate 14 is received within or nested within the pocket plate 10 (or 10' or 10") with the control plate 20 (or 20', or 20" or 20'") therebetween, the plates 10 (or 10' or 10") and 14 are typically held axially fast by a retainer ring or snap-ring (not shown). The snap-ring is received and retained in a groove formed in the plate 10 (or 10' or 10"). When assembled, the control plate 20 (or 20', or 20" or 20'") is typically located within an annular groove (not shown) formed in the pocket plate 10 (or 10' or 10").

The reverse struts 34 (or 34', or 34" or 34'") may be formed from a length of thin, cold-formed stock material, such as a cold-drawn or cold-rolled wire or spheroidized and annealed SAE 1065 steel. Each strut 34 (or 34', or 34" or 34'") may be tumbled to achieve a suitable edge corner break, such as a maximum of 0.015 inches; hardened at 1550° F.; oil quenched; and tempered at 350° F. to a minimum hardness of 53 Rockwell-C. Alternatively, the reverse struts may be formed via metal injection molding.

It is to be understood that instead of the coupling assemblies disclosed above, another embodiment of a coupling assembly having radial ratchets may also be provided wherein the shape of the radial ratchets and notch tips are preferably ellipsoids.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A coupling assembly having an overrun mode, the assembly comprising:

first and second members including first and second coupling faces, respectively, in close-spaced opposition with one another wherein at least one of the members is mounted for rotation about an axis;

a locking member disposed between the coupling faces of the first and second members, the locking member being movable between coupling and uncoupling positions; and a control element mounted for controlled movement between the coupling faces and operable to control position of the locking member, the locking member comprising:

a first member-engaging nose;

a second member-engaging tail diametrically opposite the nose;

a main body between the nose and the tail and having upper and lower faces;

a control element-engaging appendage which extends downwardly from the lower face; and a pair of oppositely projecting pivots which extend laterally from the tail for enabling pivotal motion of the locking member about a pivot axis which intersects the pivots, the control element engaging the appendage to create a moment of the locking member about the pivot axis to urge the locking member from the coupling position towards the uncoupling position, the coupling position being characterized by abutting engagement of the nose with the first member to allow one-way torque transfer to occur between the first and second members, the uncoupling position being characterized by non-abutting engagement of the nose with the first member.

2. The assembly as claimed in claim 1, wherein the control element has at least one opening which extends completely therethrough to allow the locking member to extend therethrough to the coupling position in a control position of the control element.

3. The assembly as claimed in claim 2, wherein the control element is a control or selector plate rotatable about the axis.

4. The assembly as claimed in claim 1, wherein the appendage includes a pair of oppositely projecting ears which extend laterally.

5. The assembly as claimed in claim 1, wherein one of the first and second members is a notch plate and the other of the first and second members is a pocket plate.

6. The assembly as claimed in claim 1, wherein the assembly is a controllable or selectable one-way clutch assembly.

7. The assembly as claimed in claim 1, wherein the appendage is centrally located between side faces of the main body and has a face which inclines downwardly away from the tail.

8. The assembly as claimed in claim 1, further comprising a biasing member carried by the second member to urge the locking member toward the coupling position.

9. The assembly as claimed in claim 1, wherein the appendage includes oppositely projecting ramp portions which extend laterally, each of the ramp portions having a face which inclines upwardly toward the tail.

10. The assembly as claimed in claim 9, wherein the control element is non-planar.

11. The assembly as claimed in claim 1, wherein the control element is non-planar.

12. A locking member for a coupling assembly including first and second coupling members and a control element, the locking member comprising:

a first member-engaging nose;

a second member-engaging tail diametrically opposite the nose;

a main body between the nose and the tail and having upper and lower faces;

a control element-engaging appendage which extends downwardly from the lower face; and a pair of oppositely projecting pivots which extend laterally from the tail for enabling pivotal motion of the locking member about a pivot axis which intersects the pivots, the control element engaging the appendage to create a moment of the locking member about the pivot axis to urge the locking member from a coupling position towards an uncoupling position, the coupling position being characterized by abutting engagement of the nose with the first coupling member to allow one-way torque transfer to occur between the coupling members, the uncoupling position being characterized by non-abutting engagement of the nose with the first coupling member.

13. The locking member as claimed in claim 12, wherein the locking member is a strut.

14. The locking member as claimed in claim 12, wherein an end of the tail is canted.

15. The locking member as claimed in claim 13, wherein the strut is a ratchet strut.

16. The locking member as claimed in claim 12, wherein the appendage includes a pair of oppositely projecting ears which extend laterally.

17. The locking member as claimed in claim 12, wherein the appendage is centrally located between side faces of the main body and has a face which inclines downwardly away from the tail.

18. The locking member as claimed in claim 12, wherein the appendage includes oppositely projecting ramp portions which extend laterally, each of the ramp portions having a face which inclines upwardly toward the tail.

19. The locking member as claimed in claim 12, wherein the locking member is an injection molded locking member.

20. The locking member as claimed in claim 19, wherein the locking member is a metal injection molded locking member.

21. A coupling assembly having an overrun mode, the assembly comprising:

first and second members including first and second coupling faces, respectively, in close-spaced opposition with one another wherein at least one of the members is mounted for rotation about an axis;

a locking member disposed between the coupling faces of the first and second members, the locking member being movable between coupling and uncoupling positions; and a control plate mounted for controlled movement between the coupling faces and operable to control position of the locking member, the locking member comprising:

a first member-engaging nose;

a second member-engaging tail diametrically opposite the nose;

a main body between the nose and the tail and having upper and lower faces;

a control plate-engaging appendage which extends downwardly from the lower face; and a pair of oppositely projecting pivots which extend laterally from the tail for enabling pivotal motion of the locking member about a pivot axis which intersects the pivots, the control plate engaging the appendage to create a moment of the locking member about the pivot axis to urge the locking member from the coupling position towards the uncoupling position, the coupling position being characterized by abutting engagement of the nose with the first member to allow one-way torque transfer to occur between the first and second members, the uncoupling position being characterized by non-abutting engagement of the nose with the first member.

* * * * *